Figure 1:
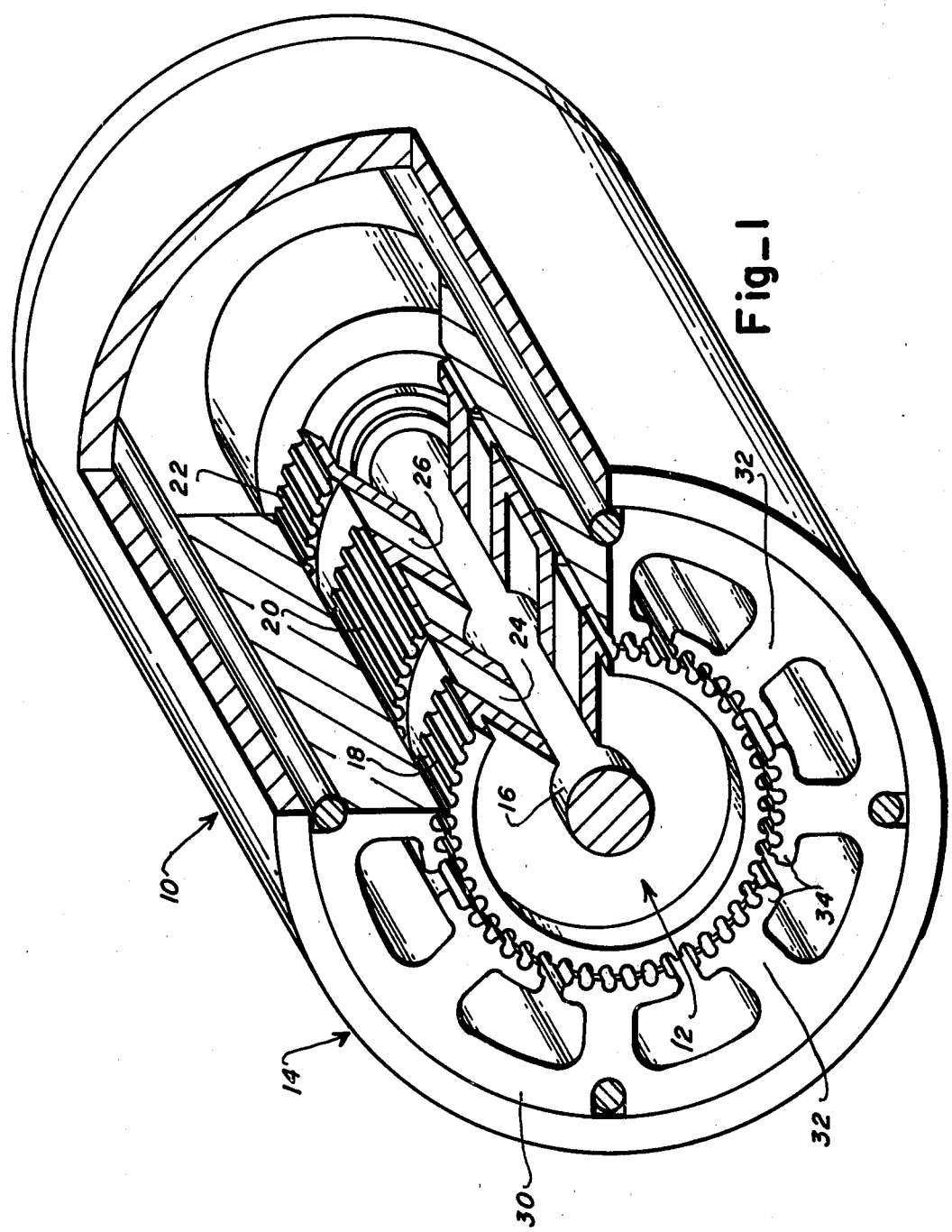

United States Patent [19]

Urschel

[11] 4,339,679
[45] Jul. 13, 1982

[54] LOW-INERTIA HIGH-TORQUE SYNCHRONOUS INDUCTION MOTOR

[75] Inventor: Edward O. Urschel, Long Beach, Calif.

[73] Assignee: Litton Systems, Inc., Murphy, N.C.

[21] Appl. No.: 225,584

[22] Filed: Jan. 16, 1981

[51] Int. Cl.³ .............................................. H02K 37/00
[52] U.S. Cl. .................................. 310/49 R; 310/156; 310/162
[58] Field of Search ................. 310/49, 114, 156, 112, 310/126, 168, 162–165

[56] References Cited

U.S. PATENT DOCUMENTS

| | | | |
|---|---|---|---|
| 3,148,319 | 9/1964 | Fredrickson | 318/166 |
| 3,206,623 | 9/1965 | Snowdon | 310/162 |
| 3,293,469 | 12/1966 | Crawford et al. | 310/168 |
| 3,321,652 | 5/1967 | Opel | 310/168 |
| 3,535,604 | 10/1970 | Madsen et al. | 318/138 |
| 3,777,196 | 12/1973 | Field | 310/156 |
| 3,956,650 | 5/1976 | Field | 310/156 |
| 4,025,910 | 5/1977 | Field | 310/162 |
| 4,127,802 | 11/1978 | Johnson | 310/156 X |
| 4,134,054 | 1/1979 | Akamatsu | 310/168 X |
| 4,306,164 | 12/1981 | Itoh et al. | 310/49 |

Primary Examiner—Donovan F. Duggan
Attorney, Agent, or Firm—Brian L. Ribando

[57] ABSTRACT

A low inertia synchronous induction motor for driving a daisy wheel printing element comprising a rotor assembly including an elongated motor shaft, a first laminated drum-shaped pole piece mounted concentrically on the shaft, second and third laminated cup-shaped pole pieces concentrically mounted on the shaft at either end of the drum-shaped piece and outwardly facing therefrom, a common number of axially-oriented, evenly spaced teeth formed on the respective circumferences of each of the pole pieces, the teeth of the second and third pole pieces axially aligned with each other and staggered with respect to the teeth of the first pole piece, a first washer-shaped, axially-magnetized, rare earth magnet mounted concentric with the shaft and sandwiched between the first and second pole pieces, and a second washer-shaped, axially-magnetized, rare earth magnet mounted concentric with the shaft and sandwiched between the first and third pole pieces so that its magnetic field is in opposition to the field of the first magnet whereby each the magnet exerts a magnetic force of a common polarity on opposite ends of the first pole piece and an opposite polarity magnetic force on the second and third pole pieces, respectively, and a stator assembly coaxial with the rotor assembly, the stator assembly including a cylindrical stack of selectively configured internally toothed stator laminations having an axial length substantially equal to the sum of the combined axial lengths of the pole pieces and the magnets.

3 Claims, 2 Drawing Figures

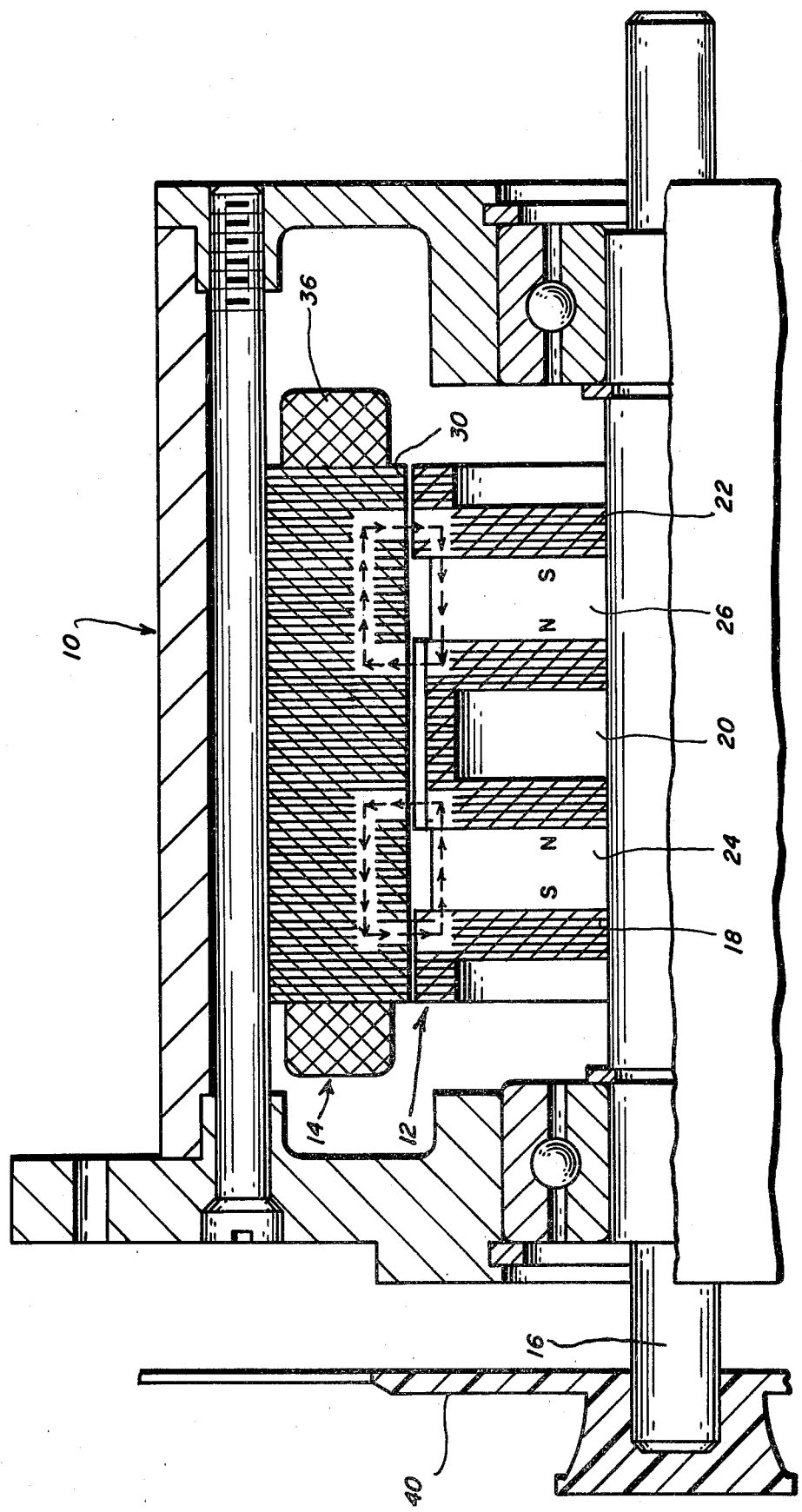
Fig_2

LOW-INERTIA HIGH-TORQUE SYNCHRONOUS INDUCTION MOTOR

This invention relates to low-inertia high-torque synchronous induction motors which may be used for driving a daisy wheel printing element.

Synchronous induction motors having low inertia rotor assemblies are well known in the art. Such motors are designed to provide quick and accurate angular positioning, and, accordingly, mahy be advantageously utilized to drive daisy wheel printing elements. Since rotor inertia critically influences the positioning speed of the motor, it is highly desirable to provide a motor with a low-inertia rotor for such applications. Likewise, it is desirable to provide a relatively high-torque motor for proficient operation.

Conventionally, high-torque synchronous induction motors employ a stacked rotor construction wherein a plurality of rotor magnet assemblies are mounted on a single shaft with spacers between each assembly. In this way, a plurality of magnetic flux paths are created between the rotor and the stator thereby generating more torque than a single rotor magnet assembly. The magnet assembly spacers, however, add to the axial length and to the inertia of the rotor.

It is, accordingly, an object of the present invention to provide an improved synchronous induction motor having a low inertia rotor assembly which includes a plurality of magnets for generating multiple flux paths.

It is another object of the present invention to provide such a motor designed for driving a daisy wheel.

Other objects and advantages of the present invention will become apparent from the following portion of this specification and from the accompanying drawings which illustrate, in accordance with the mandate of the patent statutes, the presently preferred embodiment incorporating the principles of the invention.

FIG. 1 is a perspective view in partial section of a low-inertia synchronous induction motor according to the teachings of the present invention; and FIG. 2 is a sectional view of a rotor assembly indicating the magnetic flux paths.

Referring first to FIG. 1, there is shown a synchronous induction motor generally indicated by the reference numeral 10. The synchronous induction motor includes a rotor assembly 12 mounted concentrically within a stator 14. The rotor assembly comprises an elongated motor shaft 16 on which laminated pole pieces 18, 20 and 22 and washer-shaped magnets 24 and 26 are concentrically mounted.

The pole pieces 18, 20 and 22 are constructed from annular laminations having forty-eight teenth symmetrically arranged around their circumference. The teeth of adjacent laminations are aligned to form axially oriented teeth in the assembled pole piece. The laminated construction is preferred due to the known eddy current reduction properties of such structures.

The central pole piece 20 is formed in the shape of a hollow drum. The other two pole pieces 18 and 22 are generally cup-shaped and are mounted at either end of the drum-shaped piece 20 having their open ends facing outwardly therefrom. When mounted on the shaft 16, the teeth of the cup-shaped pole pieces 18 and 22 are staggered with respect to the teeth of the central pole piece 20.

The washer-shaped magnets 24 and 26 are sandwiched between the central pole piece 20 and the respective end pole pieces 18 and 22. In the preferred embodiment, rare earth magnets such as samarium cobalt are used. The magnets 24 and 26 are axially magnetized and are mounted so that their magnetic fields are opposed. Hence, each magnet exerts a magnetic force of the same polarity on each end of the central pole piece and of the opposite polarity on the end pole pieces. As can be seen in FIG. 2, the drum-shaped pole piece 20 is as a north polar element for both magnets and the cup-shaped pieces 18 and 22 serve as south polar elements.

The opposing configuration of the magnets in the rotor permits the creation of two separate flux paths, as shown in FIG. 2, without the use of spacers. The resulting shorter rotor can, accordingly, be spanned by a stator having an approximately 15% reduced length. Additionally, the elimination of spacers from the rotor reduces the inertia of the rotor assembly, resulting in quicker acceleration and deceleration speeds.

The stator assembly 14 includes a cylindrical stack 30 of selectively configured internally toothed stator liminations having an axial length substantially equal to the sum of the axial dimensions of the pole pieces and the magnets. The internal teeth of the stator laminations are axially aligned and are supported on eight internally projecting ribs 32 to form stator poles 34. Wire 36 is wound around the ribs 32 so that the stator poles 34 are energized in a known way by appropriate circuits to generate the magnet fields required to achieve 1.875° incremental indexing of the rotor assembly which results in the rotor having 192 positions.

In a preferred application, the motor is employed in a high speed daisy wheel printer wherein a print wheel 40 having 96 spokes is secured to a projecting end of the motor shaft 16. Accordingly, the motor 10 positions the daisy wheel 40 in any of 96 positions through a conventional double stepping technique which is employed for efficient printer operation.

What is claimed is:

1. A low inertia synchronous induction motor for driving a daisy wheel printing element comprising:
   a rotor assembly including
      an elongated motor shaft,
      a first laminated drum-shaped pole piece mounted concentrically on said shaft,
      second and third laminated cup-shaped pole pieces concentrically mounted on said shaft at either end of said drum-shaped piece and outwardly facing therefrom,
      a common number of axially-oriented, evenly spaced teeth formed on the respective circumferences of each of said pole pieces,
      the teeth of said second and third pole pieces axially aligned with each other and staggered with respect to the teeth of said first pole piece,
      a first washer-shaped, axially-magnetized, rare earth magnet mounted concentric with said shaft and sandwiched between said first and second pole pieces, and
      a second washer-shaped, axially-magnetized, rare earth magnet mounted concentric with said shaft and sandwiched between said first and third pole pieces so that its magnetic field is in opposition to the field of said first magnet,
   a stator assembly coaxial with said rotor assembly including a cylindrical stack of selectively configured laminations defining a plurality of internally projecting, toothed stator poles, and said stator poles having an axial length substantially equal to the sum of the combined axial lengths of said pole pieces and said magnets.

2. A low-inertia synchronous induction motor comprising:
   a rotor assembly including
      an elongated motor shaft,
      two cup-shaped and at least one drum-shaped pole pieces mounted concentrically on said shaft in an axial array, said cup-shaped pieces mounted on the ends of said array and facing outwardly,
      a common number of axially oriented, evenly spaced teeth formed on the circumference of each of said pole pieces,
      said teeth of each of said pole pieces being staggered with respect to adjacent pole pieces in said pole piece array and aligned with respect to alternate pole pieces,
      a plurality of washer-shaped, axially-magnetized, rare earth magnets mounted concentric with said shaft and sandwiched one each between adjacent pole pieces in said array, and
      said magnets mounted so that each successive magnetic field is axially oppositely aligned whereby each drum-shaped pole piece serves as a common pole piece of the same polarity for two magnets,
   a stator assembly coaxial with said rotor assembly including a cylindrical stack of selectively configured laminations defining a plurality of internally projecting, toothed stator poles, and
   said stator poles having an axial length substantially equal to the sum of the combined axial lengths of said pole pieces and said magnets.

3. A low-inertia synchronous indicator motor according to claim 1 or 2 wherein said washer-shaped magnets are comprised of samarium cobalt.

* * * * *